United States Patent [19]
Geimer

[11] 4,141,383
[45] Feb. 27, 1979

[54] OUTLET FIXTURE FOR FLUID MEDIA
[75] Inventor: Josef Geimer, Drunen, Netherlands
[73] Assignee: Turke & Bolte, Sümmern, Fed. Rep. of Germany
[21] Appl. No.: 721,964
[22] Filed: Sep. 10, 1976
[51] Int. Cl.² ............................................. F16K 19/00
[52] U.S. Cl. ..................... 137/606; 251/130; 251/285
[58] Field of Search ................... 4/192; 137/606, 801; 251/130, 285

[56] References Cited
U.S. PATENT DOCUMENTS

| 1,822,668 | 9/1931 | Protzeller | 251/285 X |
| 3,374,957 | 3/1968 | Tyler | 137/606 X |
| 3,556,146 | 1/1971 | Groen | 137/606 |
| 3,989,222 | 11/1976 | Yoshiyasu | 251/130 X |

Primary Examiner—Robert G. Nilson
Attorney, Agent, or Firm—Orville N. Greene; Frank L. Durr

[57] ABSTRACT

An essential contactless control means is provided for operating a device which mixes and discharges two fluid media such as water faucet for discharging a temperature controlled mixture of hot and cold water. In the case of the water faucet, for example, the hot and cold water flow to the mixing chamber of the faucet is controlled by a pair of magnetic valves, preferably operated by an electronic circuit, which opens the valves when the hand or an object approaches the control antenna of the circuit. In this device, expensive separate additional controls are eliminated by providing the magnetic valves with manually adjustable knobs.

1 Claim, 3 Drawing Figures

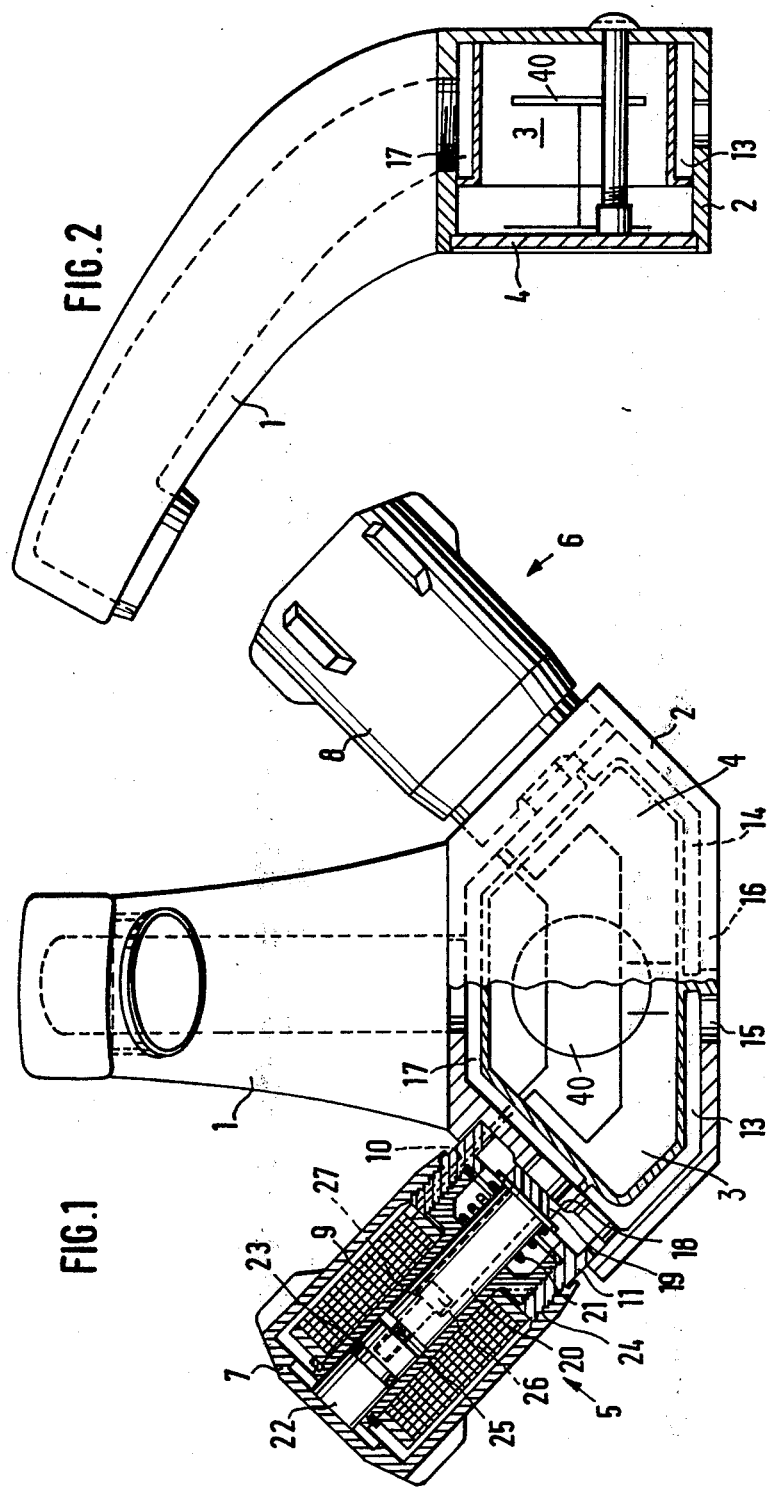

OUTLET FIXTURE FOR FLUID MEDIA

The invention concerns a preferably contactless electronically controlled outlet fixture for fluid media, e.g., a water faucet. If desired, a fluid protected push button or toggle switch can be provided for operating the fixture.

Usually, water discharge fixtures, as they are and chiefly found for example on washing stands, consist of a mixing chamber to which supply lines for hot and cold water are connected for mixing the same. Not only the quantity of water altogether, but also the proportion of hot and cold water and thereby the water temperature can be regulated by hand manipulation.

An effort is now being made to broaden the zones of use of such water discharge fittings, preferebly on hygienic grounds, to avoid contact with the operating means. Such requirements are encountered especially in laboratories, in operating rooms, generally speaking, in medicine, but also in food and luxury operations.

Further considerations are concerned with the saving of water. With the kind of contactless operating fixture, as investigations have shown, a considerable amount of savings is possible without reducing the essential requirements. Thus, it is considered that savings can be made, especially on the consumption at wash stands of households and in factories, governmental agencies and administrations.

Similar situations also exist for fixtures for other fluid media. Thus, for example, a contactless functioning fixture can find use advantageously as a mixing device for motor fuel for two cycle motors and generally any place where different fluid media are to be mixed.

With respect to the above outlined considerations, proposals have already been made to control the water discharge fixture by ultra sound. In this set up, a sender and a receiver for ultrasonic control means is provided under the water fixture which on approaching, opens the magnetic valve in the water supply. To this apparatus, a thermostat for establishing the desired water temperature is connected which must be operated by hand. This whole arrangement is really expensive from the point of view of size and cost and can, therefore, at best be considered only in relationship with the operating room or the like.

Other proposals relate to the control of the water flow by means of the so-called "sensors" which practically are antennas of an electronic control circuit, which switch on upon approach and thus can be designated as approach switches. A known embodiment with such sensors provides that by approaching, on the right side of the water course, e.g., a magnetic valve in the cold water supply and by approaching on the left side, a magnetic valve in the hot water supply is switched on. When both valves are switched, mixed hot and cold water flows out, the temperature of which can be previously regulated by means of a separate cut-off valve. Also, this arrangement is fairly expensive, necessitating a separate arrangement of electronic control in a suitable housing and the services of a cut-off valve for the adjustment to the desired temperature of the mixed water, provided as mentioned above, which is not on or in the immediate vicinity of the water supply.

As stated, the known arrangements are overly expensive and are, in fact, so costly that they have limited use for many applications.

This invention, accordingly, is based on the problem of building a controlled outlet for fluid media, preferably controlled by an associated or built-in electronic circuit, which moreover is improved as a mixing means for different media, e.g. for hot and cold water, which is compact in structure and is moderately priced, however at the same time, taking into account, above all, that it has a great sphere of utility, especially in households.

The invention solves the problem set forth through an improved mixing means with a manipulatable outlet for fluid media, preferably controlled by a built-in electronic control means, wherein two magnetic valves for the feeding of the two media are provided, whose opening and closing strokes are controlled by the associated electronic control, wherein the valves moreover are equippped with manually rotatable knobs for adjusting the flow. The associated electronic circuit is accommodated in the known way in the base of the outlet, which also has the operating antenna as the associated switch for the electronic circuit. Instead of this built-in circuit switch, a simple moisture protected toggle or push-button switch can be provided.

It provides also a compact unit in which all control and regulating parts, as well as the electronics are contained in the fixture, as also are the manual controls. The structure is not only compact, but also simple and inexpensive, since just two regulatable magnetic valves are necessary, which are not only electronically controllable, but also hand regulatable. The control possibilities satisfy all usual requirements of such fixtures. The flow of the media is released, preferably contactless, only by the approach, for example, to a water outlet of the to-be-cleansed hand or object. The total desired amount of the media and the desired proportions of the media in the mixture, e.g., the water temperature, can be regulated immediately manually, at the outlet.

Advantageously, and in an improved form of the invention, both valves are equipped with a follower between the magnetic shifting bolt and the magnetic striking bolt, so that the media supply can also be opened by hand operation if the current source for the electronic control should fail.

Instead of a magnetic valve with a valve cap positioned on a valve seat, a magnetic valve with a retractable membrane operated by a magnetic shifting bolt; can be provided to advantage.

Thereby, the functionability of such an outlet device can be essentially improved. The valve with a valve disk or cap lying on a valve seat requires a not insignificant expenditure of force for operation. Just as this force or energy consumption is important, the construction and functioning is influenced greatly. By the proposed membrane variation of the invention, the opening and closing of the valve results with the cooperation of the water pressure. The magnetic tripping at any given time only starts the opening and closing process which directs the essential release.

For the volume regulation, a quantity regulation is provided in the form of a tubular sleeve having a screw thread on the back side, which encircles the magnetic bolt and its spring. Through lengthwise shifting of the volume regulator, by means of a hand operable rotating knob which interacts with the screw threads, the membrane can be limited in its free movement and thereby the volume of flow through of the medium determined. The tubular sleeve has a longitudinal slit in which a lug slidable therewith, engages in order to guarantee a longitudinal movement of the tubular housing without rotation.

Here also, in order to guarantee an emergency use of the fixture by failure of the magnetic valves, the tubular sleeve of the volume regulator can be provided, at the end thereof adjacent the end of the magnetic bolt, with an inwardly projecting bead or flange which cooperates with a corresponding shoulder on the magnetic bolt. With the help of this means, the magnetic shifting pin can be lifted manually, e.g., when there is a failure of current, so that then the fixture remains fully operable.

The invention will be further explained in the following description of the reproduced embodiments of the invention somewhat schematically shown in the attached drawings:

FIG. 1 is a front view, partly in section, of mixing type of water faucet.

FIG. 2 is a side view of the water faucet of FIG. 1, partly in section.

Figure 3:
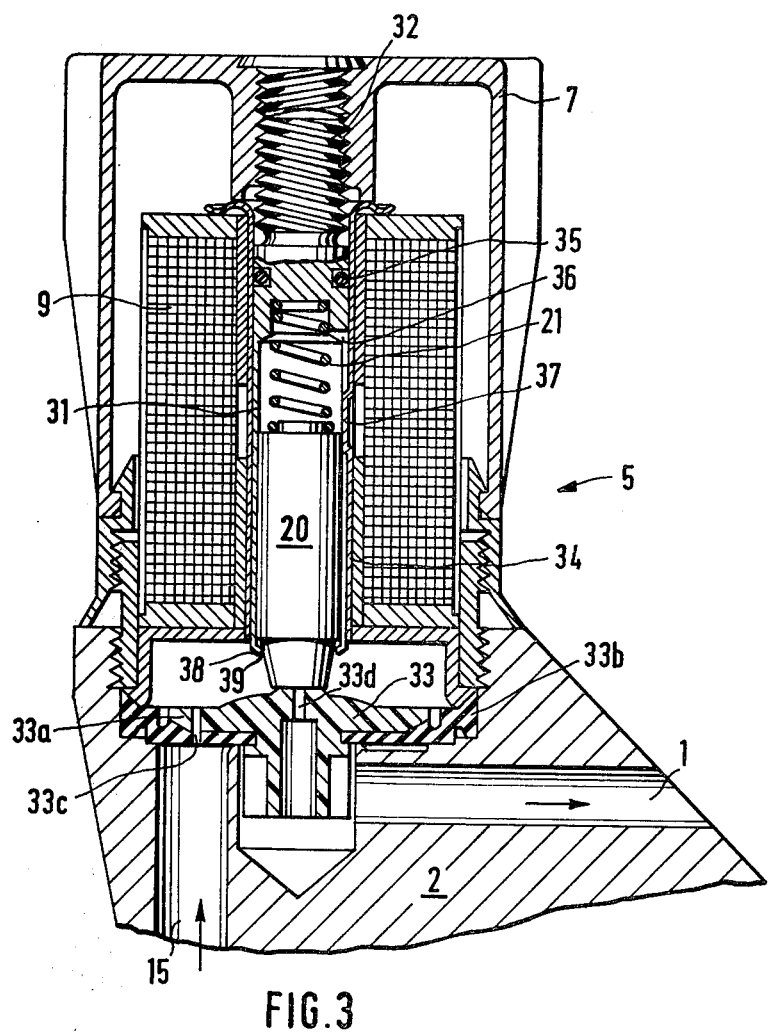
FIG. 3 is a showing of a modified form of the invention.

The water faucet of FIG. 1 shows the essential water outlet 1 which forms the upper continuation of the fixture 2. In the housing 2, there is sufficient space in this middle area 3 for the accommodation of the electronic switch and its antenna 4. The electronic circuit comprises a known switching circuit element and operates with a current of 24 volts which, e.g., can be obtained for disposal to all units from an existing meter or fuse box present in all houses or apartments.

At both sides of the water outlet 1, two magnetic valves 5 and 6 are arranged which are controllable by the hand knobs 7 and 8. A connection of the magnetic coil 9 of the magnetic valve with the electronic circuit 40 occurs over appropriate lines which are passed through a boring 10 in housing 11 of the magnetic valves. The housing 2 of the fixture has near the interior space 3, two water chambers 13 and 14 for hot and cold water. Thus, e.g., the chamber 13 can be the hot water chamber with a connection 15 for the hot water conduit and the chamber 14, the cold water chamber with the connection 16 for the cold water conduit. Below the water outlet 1, in the upper area of the housing 2 is found the water mixing chamber 17, which obviously, to begin with, is separated from the hot water and cold water chambers. As can be recognized, a connection can be established by means of the valve, as is clear in the left hand area of FIG. 1, which shows the hot water valve in cross-section. Here, the passage between the hot water chamber 13 and the mixing chamber 17 is closed when the valve cap 19 rests on the valve seat 18. The structure of the cold water valve corresponds in all details to that of the hot water valve.

In the magnetic valve, a magnetic plunger or bolt 20 is arranged which is constructed on the rear side of the valve cap 19. It is, moveover, provided in the usual way with a resetting spring 21. Such a spring (not shown) can also be arranged on a retaining means 25 at the rear surface interiorly of the magnetic bolt. Moreover, a magnetic stopping bolt 22 is found in the interior of the valve which is fixed on the rotatable knob 7. In the area of the magnetic stopping bolt 22, moreover, a packing 23 is found. The rotatable knob 7 is connected below by a steep screw thread 24 to the housing 11 of the magnetic valve.

Should the electronic circuit be made to function by the built-in circuit operating antenna or operated by a corresponding means, it first opens the magnetic valve by means of the magnetic coil to permit flow through the valve, since under the influence of the magnet coil, the magnetic circuit bolt is attracted, therewith the valve cap is removed from the valve seat and the passage opened. The water stream proceeds thus from the hot and cold water mixing chamber, to the water outlet, the mixture corresponding to those settings of the rotatable knobs of the magnetic valves. The passage cross-section of the valve can now additionally be changed through operation of the rotatable knobs. Thereby, the total water outflow, as well as the proportions of hot and cold water can be regulated. This means, that first of all, the water outflow is controllable by means of the associated switch or another circuit. With this so far as it treats of the associated circuit, the hygienic requirements are completely met. If it should happen, after the valves are opened, that the water requires regulation in run-off volume or temperature, such regulation can be done with the hand rotatable knobs with the prewashed hands. Thereby, the output, as it occurs in the whole predominant extent in practice, is satisfied, in connection with which no expensive circuit arrangements and constructions are required as, for example, thermostats, special switch boxes, cut-off valves separate from the fixture for the hot and cold water supply, etc.

Between magnetic shift bolt or plunger 20 and magnetic stop bolt 22, a engaging piece 25 can be provided, which is connected with the stop bolt 22 and with the head 26 lying against a shoulder 27 adjacent the inner end of magnetic shift bolt 20. This engaging piece 25 permits an actuation of the fixture if once the current should fail and the electronic circuit can not operate it. With this engaging piece, the magnetic bolt 20 can be actuated with the aid of the rotatable knob 7, so that by means of the knob 7 not only can the passage area of the valve be changed, but also the fundamental flow-through can be accomplished by lifting the valve cap from the valve seat. With this arrangement, there is the great advantage that the fixture remains in working order even with eventual current failure.

Moreover, the magnetic shifting bolt 20 can in known ways have in its jacket surface, a longitudinal groove so that the water pressure acts on the back side of the valve cap 19 when the valve is closed to reinforce the action of the restoring spring 21.

The membrane 33 comprises, in a known way, a plastic part 33a and a stretchable elastomeric part 33b. It is provided with a boring 33c which takes care of the admission of water to the opposite or back side of the membrane so that the water pressure holds the valve closed. A cylindrical perforation 33d takes care of the connection for water discharge from the valve when the magnetic bolt 20 is lifted. The membrane 33, stretched at its circumference, but still freely movable, can be arched upwardly and provide an open passage.

The tubular sleeve 31 fits closely on the packing tube 34, moreover a circumferential joint 35 is provided in the wall of tubular sleeve 31 which cooperates with the packing tube 34. The tubular sleeve 31 has additionally a longitudinal slot 36 in which a sliding stud 37 of packing tube 34 slides. Thereby, a strictly longitudinal movement of the tubular sleeve 31, without rotation is guaranteed.

In order now to guarantee manual operation of the fixture with this device in case of emergency, the tubular sleeve 31 is provided at the end thereof, nearest the membrane 33, with an interior projecting flange 38 which cooperates with a corresponding shoulder 39 of the magnetic shifting bolt 20. By these means, the magnetic bolt 20, together with the membrane 33, e.g., upon current failure, can be lifted manually by the rotating knob of the volume regulator so that the fixture remains fully operable.

According to FIG. 3, magnetic valve 5 is screwed into the fixture housing 2 containing the inlet 15 and the outlet 1, and rotatable knob 7, which is hand operable, is provided as in the first embodiment, but a membrane valve is employed. The rotatable knob 7 grips the magnetic coil 9. A tubular sleeve 31 slides in the enclosed space within coil 9, which cooperates with the rotatable knob 7 because of the rear side attachment with threads 32. In the tubular sleeve 31, the magnetic shifting bolt 20 is arranged with the restoring spring 21. Through displacement of the tubular sleeve by means of the rotating knob 7, the freedom of movement of the membrane 33 can be limited, whereby also any desired volume of passage for the medium can be determined.

As already mentioned, the electronic circuit can be of any known type which is made to operate when the hand or a body is brought into proximity to the antenna thereof.

I claim:

1. In an outlet fixture for mixing and discharging two fluid media, such as hot and cold water, of the type wherein the discharge of the media is controlled by an electronic circuit having an antenna which cooperates with magnetic valve means which is operated when the hand or similar object is brought into proximity with said antenna, the improvement comprising a base portion including a mixing chamber for the fluid media, two media supply pipes for supplying the respective fluids to the mixing chamber, two magnetic valves for controlling the flow of fluids to the mixing chamber connected to said base portion, a single discharge means connected to the base portion to receive the mixed fluids from the mixing chamber and discharge same from the front side of the fixture, said base portion also including said electronic circuit and its associated antenna, said antenna being positioned in the front side of the base portion, a pair of hand operable rotatable knobs, one for each of said magnetic valves, said knobs being manually adjustable for establishing the maximum of flow through the respective valves, at least one of said magnetic valves comprising a shifting bolt and a magnetic impact bolt, an engaging piece fastened on the magnetic impact bolt extending between the magnetic shifting bolt and the magnetic impact bolt, shoulder means on the interior of the shifting bolt, said engaging piece having a head lying against said shoulder means whereby said valve may be manually operated in the event of a power failure.

* * * * *